US007719230B2

(12) United States Patent
Griffin

(10) Patent No.: US 7,719,230 B2
(45) **Date of Patent: *May 18, 2010**

(54) KIT OF POWER TOOLS

(75) Inventor: Paul W. Griffin, Kenosha, WI (US)

(73) Assignee: Snap-On Incorporated, Kenosha, WI (US)

(*) Notice: Subject to any disclaimer, the term of this patent is extended or adjusted under 35 U.S.C. 154(b) by 575 days.

This patent is subject to a terminal disclaimer.

(21) Appl. No.: 11/588,637

(22) Filed: Oct. 27, 2006

(65) Prior Publication Data

US 2008/0101100 A1 May 1, 2008

(51) Int. Cl.
*H02J 7/00* (2006.01)

(52) U.S. Cl. ........................ 320/114; 320/134; 429/100

(58) Field of Classification Search ......... 320/112–115, 320/134; 429/100
See application file for complete search history.

(56) References Cited

U.S. PATENT DOCUMENTS

| | | | |
|---|---|---|---|
| 5,221,210 | A | 6/1993 | Bormuth et al. |
| 5,551,883 | A | 9/1996 | Davis |
| 5,674,078 | A | 10/1997 | Davis et al. |
| 5,799,739 | A | 9/1998 | Takaada et al. |
| 5,902,080 | A | 5/1999 | Kopras |
| D415,100 | S | 10/1999 | Buck |
| 6,057,608 | A | 5/2000 | Bailey |
| 6,223,835 | B1 | 5/2001 | Habedank et al. |
| 6,304,058 | B2 | 10/2001 | Watson et al. |
| 6,329,788 | B1 | 12/2001 | Bailey, Jr. et al. |
| 6,350,149 | B1 | 2/2002 | Nakane |
| 6,502,949 | B1 | 1/2003 | Horiyama et al. |
| 6,515,451 | B2 | 2/2003 | Watson et al. |
| D471,865 | S | 3/2003 | Garvis et al. |
| D477,811 | S | 7/2003 | Niwa |
| D483,012 | S | 12/2003 | Hsu |
| 6,656,626 | B1 | 12/2003 | Mooty et al. |
| 6,729,414 | B2 | 5/2004 | Cooper et al. |
| 6,840,335 | B1 | 1/2005 | Wu |
| 7,273,159 | B2 * | 9/2007 | Brotto ........................... 227/1 |
| 7,589,500 | B2 * | 9/2009 | Johnson et al. ............. 320/134 |
| 2004/0029426 | A1 | 2/2004 | Lui |
| 2004/0106036 | A1 | 6/2004 | Geis |
| 2004/0153596 | A1 | 8/2004 | Monteiro |
| 2004/0196002 | A1 | 10/2004 | Watson et al. |
| 2005/0267776 | A1 * | 12/2005 | Selby et al. .................... 705/1 |
| 2006/0096771 | A1 * | 5/2006 | Brotto ........................ 173/217 |
| 2006/0113956 | A1 * | 6/2006 | Bublitz et al. ............... 320/112 |

* cited by examiner

*Primary Examiner*—Edward Tso
*Assistant Examiner*—Ramy Ramadan
(74) *Attorney, Agent, or Firm*—Barnes & Thornburg LLP

(57) ABSTRACT

A kit comprising a plurality of power tools configured to operate on different operating voltages and a plurality of receivers configured to provide different output charging voltages for charging the power tools. Each receiver is configured to engage and charge only the one or more power tools having an operating voltage equal to or greater than the output charging voltage of that receiver.

29 Claims, 6 Drawing Sheets

KIT OF POWER TOOLS

BACKGROUND

This disclosure relates generally to power tools and more specifically to a kit that includes power tools that operate on different voltages.

In the power tool field, it is common to use different types of power tools to address the varied needs of the user of the power tools. It is also common to use power tools that operate on different voltages also to address the varied needs of the user. The need to use different types of power tools and/or power tools of different voltages typically cause manufacturing, costs, storage and charging issues.

SUMMARY

The present disclosure relates to a kit comprising a plurality of power tools configured to operate on different operating voltages and a plurality of receivers configured to provide different output charging voltages for charging the power tools. Each receiver is configured to engage and charge only the one or more power tools having an operating voltage equal to or greater than the output. charging voltage of that receiver. The power tools may comprise power tool housings of substantially similar construction and the receivers may comprise receiver housings of substantially similar construction.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
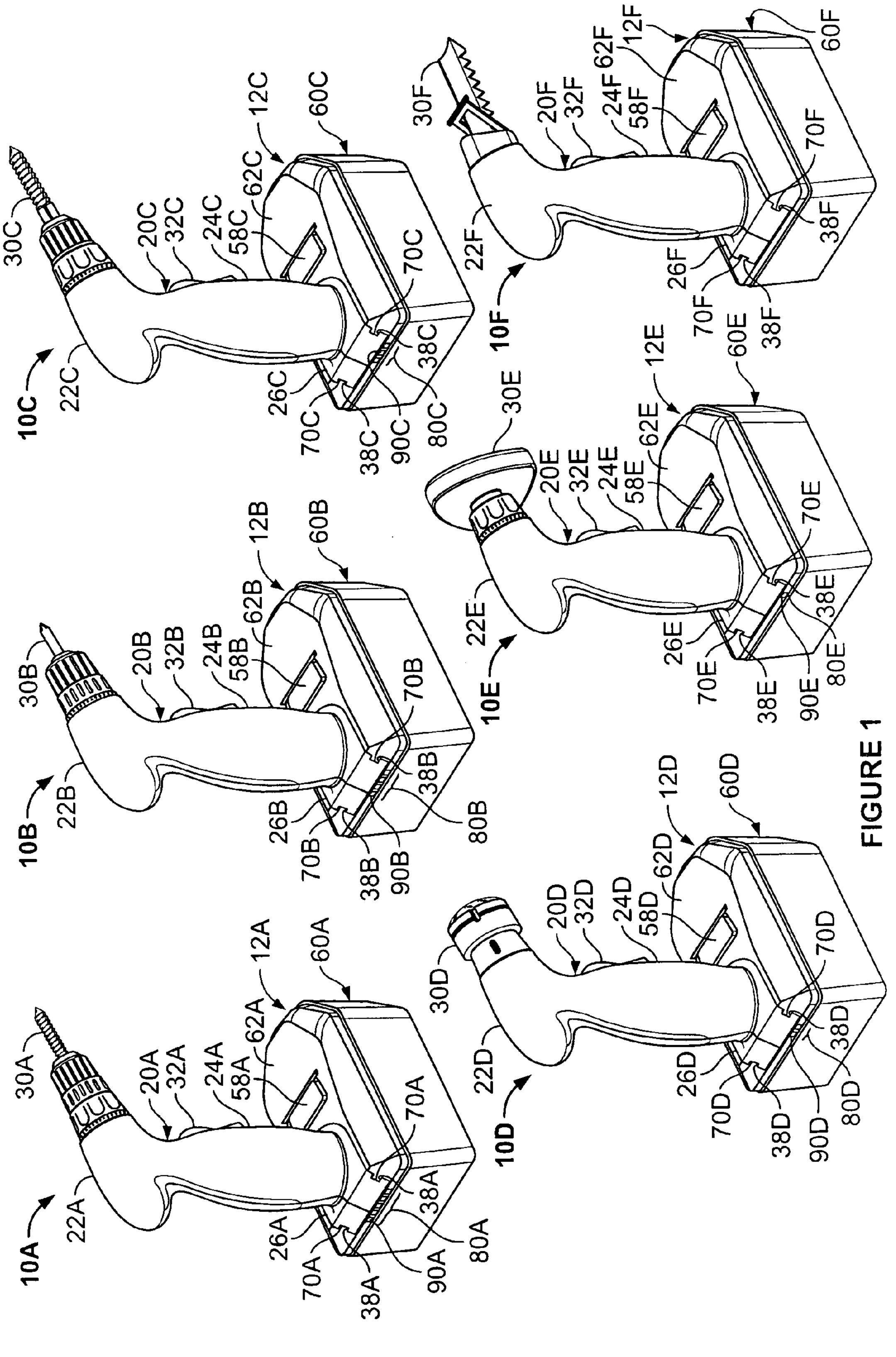
FIG. 1 is a perspective view of a plurality of power tools, a plurality of receivers engaged with the power tools to charge the power tool, and a plurality of terminal blocks electrically connecting the power tools and the receivers, including a power drill tool configured to operate on 9.6 volts engaged with a corresponding receiver configured to provide a charging output of 9.6 volts, a power screwdriver tool configured to operate on 12 volts engaged with a corresponding receiver configured to provide a charging output of 12 volts, a power drill tool configured to operate on 14 volts engaged with a corresponding receiver configured to provide a charging output of 14 volts, a power flashlight tool configured to operate on 18 volts engaged with a corresponding receiver configured to provide a charging output of 18 volts, a power sander tool configured to operate on 20 volts engaged with a corresponding receiver configured to provide a charging output of 20 volts, and a power reciprocating saw tool configured to operate on 24 volts engaged with a corresponding receiver configured to provide a charging output of 24 volts.

While the present disclosure may be susceptible to embodiment in different forms, there is shown in the drawings, and herein will be described in detail, an embodiment with the understanding that the present description is to be considered an exemplification of the principles of the disclosure and is not intended to limit the disclosure to the details of construction, methods and the arrangements of components set forth in the following description or illustrated in the drawings.

FIGS. 1-5 illustrate a plurality of power tools 10A-10F, a plurality of receivers 12A-12F, and a plurality of terminal blocks 14A-14F in accordance with an embodiment of the present disclosure. The power tools 10A-10F are in the form of a power drill 10A, a power screwdriver 10B, an other power drill 10C, a power flashlight 10D, a power sander 10E, and a power reciprocating saw 10F. The types of power tools 10A-10F included in the illustrated embodiment are merely exemplary, and may, in accordance with other embodiments, be any other suitable type, combination and construction.

Each of the terminal blocks 14A-14F is secured to or otherwise associated with a corresponding one of the power tools 10A-10F and electrically connects a respective and one of the power tools 10A-10F with one of the receivers 12A-12F. Each of the receivers 12A-12F includes a battery pack or any other suitable power source. In accordance with the present disclosure, the power tools 10A-10F, receivers 12A-12F and terminal blocks 14A-14F can be in any suitable number and have any suitable construction and the terminal blocks can be omitted or can have substantially different constructions depending upon the construction of the power tools and receivers.

Figure 2:
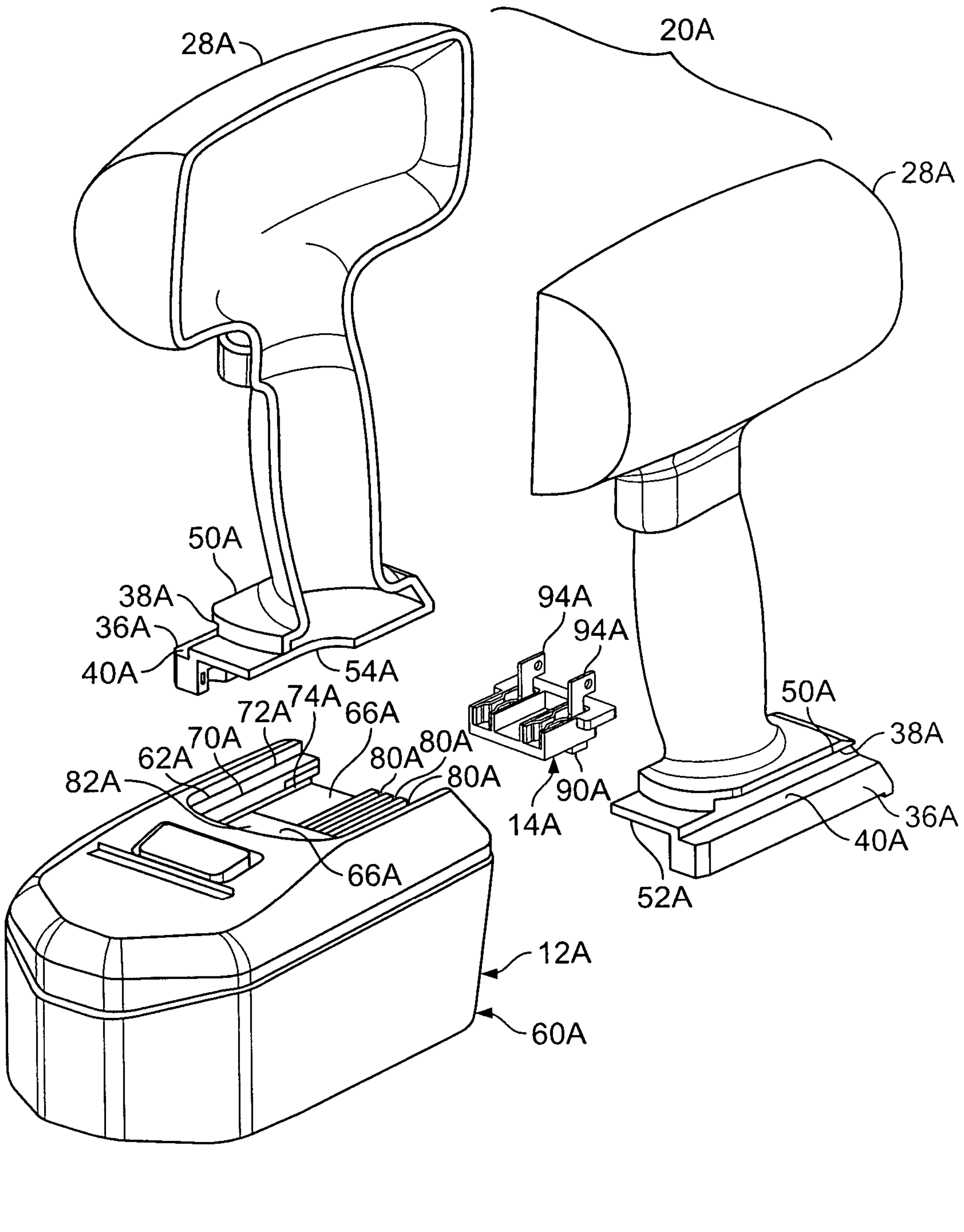
FIG. 2 is an exploded perspective view of a representative housing of one of the power tools and one of the receivers and terminal blocks of FIG. 1, illustrating the shells of the representative housing separated from each other and the terminal block associated with one of the power tools.
Figure 3:
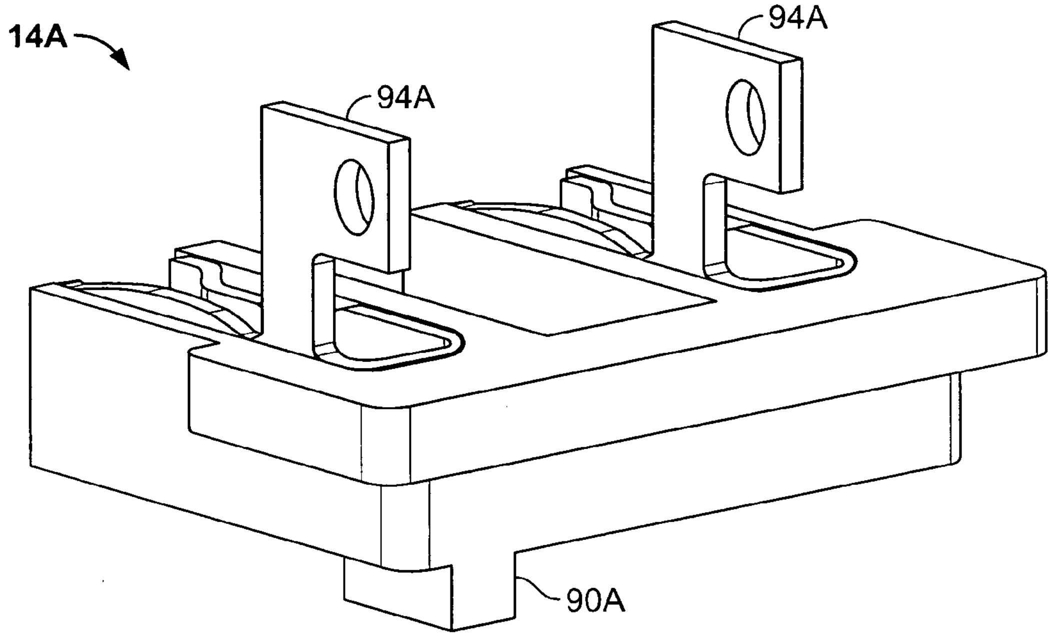
FIG. 3 is a perspective view of one of the terminal blocks associated with one of the power tools of FIG. 1.
Figure 4:
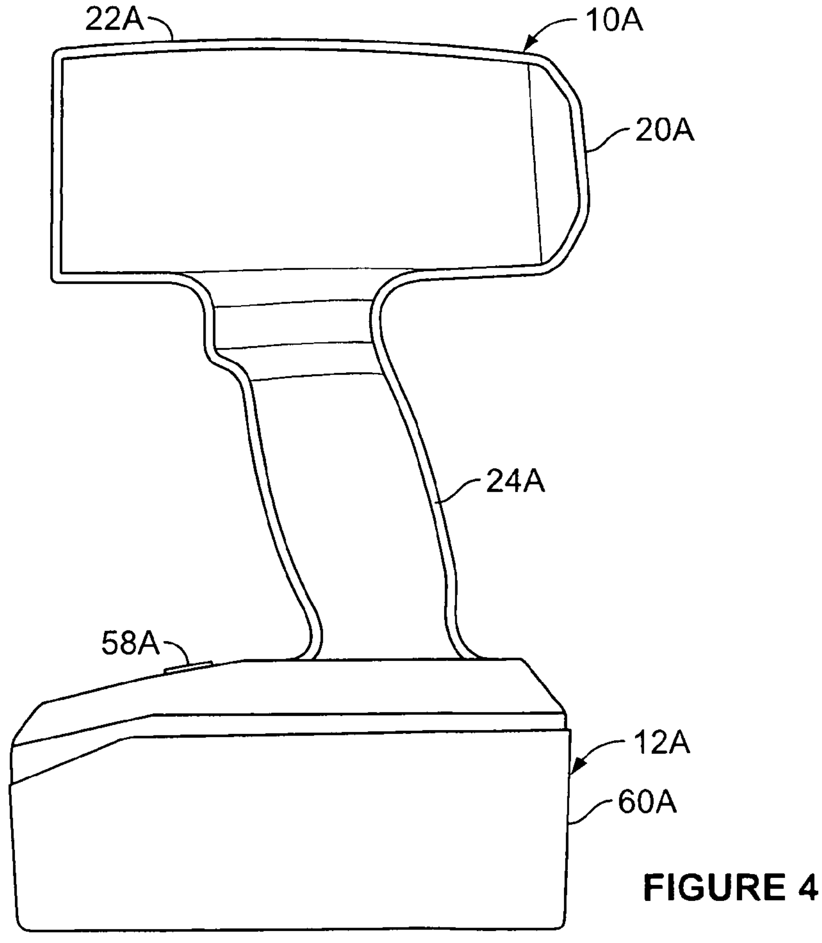
FIG. 4 is a side plan view of one of the power tools engaged with the corresponding receiver of FIG. 1.

In the illustrated embodiment, the power tools 10A-10F comprise power tool housings 20A-20F of substantially similar, if not identical, construction. With reference to FIG. 2, which illustrates a representative sample of each of the power tool housings 20A-20F, each power tool housing 20A-20F includes a working portion 22A-22F, a handle portion 24A-24F, and a base 26A-26F, and may comprise two complementary shells 28A-28F fitted or otherwise engaged together. Each of the power tools 10A-10F includes respective power tool elements corresponding to the type of power tool including working elements such as, for example, a drill bit 30A, a screwdriver 30B, a drill bit 30C, a sander 30D, a flashlight 30E, and a saw 30F, and also includes any suitable hardware and electronics to operate the tool elements. The tool elements and the hardware, and electronics may be contained partly or entirely within the power tool housing 20A-20F or may otherwise be associated with the power tool housing.

Each of the power tools 10A-10F may operate on different voltages. For example, the power tool 10A is configured to operate on 9.6 volts, the power tool 10B is configured to operate on 12 volts, the power tool 10C is configured to operate on 14.4 volts, the power tool 10D is configured to operate on 18 volts, the power tool 10E is configured to operate on 20 volts, and/or the power tool 10F is operated on 24 volts. The power tools 10A-10F may operate on any other voltages, including any other combination of voltages, in accordance with other embodiments. Each of the power tools includes an on-off switch 32A-32F.

The base 26A-26F of each power tool housing 20A-20F defines on opposed sides 36A-36F a pair of slots 38A-38F extending along most of the length of the base. The slots 38A-38F are defined by a pair of ridges 40A-40F extending along the entire length of the side 36A-36F of the base 26A-26F and by a pair of outwardly extending rails 50A-50F extending along most of the length of the base. The front of the base defines a U-shaped opening 52A-52F and the bottom of the base defines a void 54A-54f contiguous with the U-shaped opening for receiving a corresponding one of the terminal blocks 14A-14F.

The receivers 12A-12F comprise receiver housings 60A-60F of substantially similar, if not identical, construction. Each of the receivers 12A-12F is configured to engage and charge the one or more of the power tools 10A-10F that have an operating voltage equal to or greater in magnitude than the output charging voltage of the receiver. Accordingly, each of the receivers 12A-12F also includes the battery pack or any other suitable power source and any suitable hardware and electronic components to provide power from the battery pack or other power source to the one or more power tool 10A-10F. The battery packs may be contained within the receiver housing 60A-60F of be otherwise associated with the receivers 12A-12F.

The receivers 12A-12F may each provide different output charging voltages for charging the one or more of the power tools 10A-10F. For example, the receiver 12A provides an output charging voltage of 9.6 volts, the receiver 12B provides an output charging voltage of 12 volts, the receiver 12C provides an output charging voltage of 14.4 volts, the receiver 12D provides an output charging voltage of 18 volts, the receiver 12E provides an output charging voltage of 20 volts, and the receiver 12F provides an output charging voltage of 24 volts. The receivers 12A-12F may provide any other output charging voltages, including any other combination of voltages, in accordance with other embodiments. Each receiver includes a power switch 58A-58F.

Each receiver housing 60A-60F includes a top portion 62A-62F that defines a rear U-shaped opening 64A-64F and a void 66A-66F contiguous with the U-shaped opening. The top portion 62A-62F of each receiver housing 60A-60F also includes a pair of inwardly-extending rails 70A-70F that each define upper and lower slots 72A-72F and 74A-74F separated by the rail 70A-70F. The upper and lower slots 72A-72F and 74A-74F of each receiver housing are contiguous with the void 66A-66F. The receiver housing 60A-60F is configured to be slidably engageable with each of the power tool housings 20A-20F such that the pair of rails 70A-70F of the receiver housing 60A-60F are slidably received by the pair of slots 38A-38F defined by the base 26A-26F of the power tool, such that the rails 50A-50F of the power tool housings are received by the upper slots 72A-72F of the receiver housings, and such that the ridges 40A-40F of the base of the power tool are slidably received by the lower slots 74A-74F of the receiver of the housing. Thus, each of the power tool housings 20A-20F is slidably engageable with each of the receiver housings 60A-60F, except that the present disclosure further includes means for selectively engaging with each receiver 12A-12F and charging one or more power tools 10A-10F that operate on a voltage equal to or greater than the output charging voltage of the receiver.

Accordingly, in the illustrated embodiment, all of the power tool housings 20A-20F are of identical or substantially identical construction and all of the receiver housing 60A-60F are of identical or substantially identical construction. Thus, in the illustrated embodiment, all of the power tool housings 20A-20F are slidably engageable with all of the receiver housings 60A-60F by virtue of the above-described engaging structure at the base 26A-26F of the power tool housings and the top portion 62A-62F of the receiver housings. As a result, the kit in accordance with the illustrated embodiment of the present disclosure may be easier and less expensive to manufacture and may also provide other use and storage advantages over other kits or assemblies of power tools of different types and voltages and receivers or other charging structures.

Notwithstanding that in the illustrated embodiment all of the power tool housings 20A-20F are configured to engage all of the receiver housings 60A-60F, the present disclosure further includes the means for selectively engaging each receiver 12A-12F and charging only the one or more power tools 10A-10F that operate on a voltage equal to or greater to the output charging voltage of the receiver 12A-12F. Such engaging and charging means may be in any suitable form. In the illustrated embodiment, for example, the engaging and charging means comprises the terminal blocks 14A-14F and slots 80A-80E defined by the receiver housings 60A-60E, and the above-described engaging structure of the base 26A-26F of the power tool housings 20A-20F and the top 62A-62F of the receiver housing 60A-60F. The engaging and charging means may further include a contact plate 82A-82F which may incorporate any suitable structure for contacting the terminal blocks 14A-14E. Each of the terminal blocks 14A-14F is associated with one of the power tools 10A-10F. Each terminal block 14A-14F is received by the void 54A-54F of the base of the corresponding power tool 10A-10F and is secured to the base in any suitable manner.

The terminal blocks 14A-14F and slots 80A-80F are configured such that each terminal block is engageable with and can charge only the one or more receivers 12A-12F having an output charging voltage equal to or less than the operating voltage of the power tool 10A-10F to which the terminal block is secured. Each terminal block 14A-14E includes a bottom rib 90A-90E receivable in one or more of the slots of one or more corresponding receivers 12A-12E to engage one or more receivers, but the position of the rib of each terminal block depends upon the operating voltage of the power tool 10A-10E to which the terminal block is secured. The terminal block 14F does not include any ribs 90 and the receiver housing 60F does not include any of the slots 80, so that the power tool 10F is engageable with all of the receivers 12A-12F but the receiver 12F is not engageable with any of the power tools 10A-10E. Each terminal block 14A-14F further includes contacts 94A-94F.

The positions of the slots 80A-80F on the receivers 12A-12F depend upon the voltage provided by the receiver. Additionally, the receivers 14A-14D may have more than one slot so that the receivers also engage power tools having operating voltages greater than the output charging voltage of the receiver. Thus, in the illustrated embodiment, the terminal block 14A-14F associated with each power tool 10A-10F engages only the receivers 14A-14F having output charging voltages that equal or are less than the operating voltage of the power tool, and, as a result, each power tool engages and can be charged by only the receivers having output charging voltages that equal or are less than the operating voltage of the power tool.

Figure 5A:
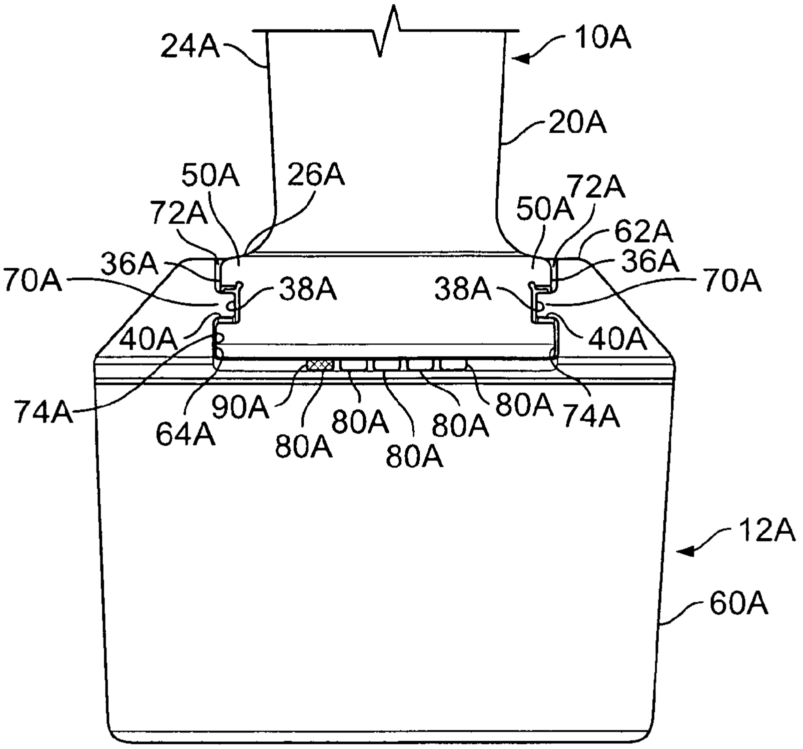
FIG. 5A-5F are broken rear plan views illustrating each of the power tools of FIG. 1 engaged with its corresponding receiver of FIG. 1.

FIGS. 5A-5F provide examples of locations of the ribs 90A-90E of the respective terminal blocks 14A-14E and locations of the slots 80A-80E of the respective receivers 12A-12E illustrated in FIG. 1. FIG. 5A shows the 9.6V power tool 10A engaged with and being charged by the receiver 12A, which includes a 9.6V battery pack, and also shows the positions of the rib 90A corresponding to the power tool 10A and one of the slots 80 of the receiver 12A receiving the rib 90A. The receiver 12A includes other slots 80A and, thus, is also engageable with and can charge the other power tools 10B-10F.

Figure 5B:
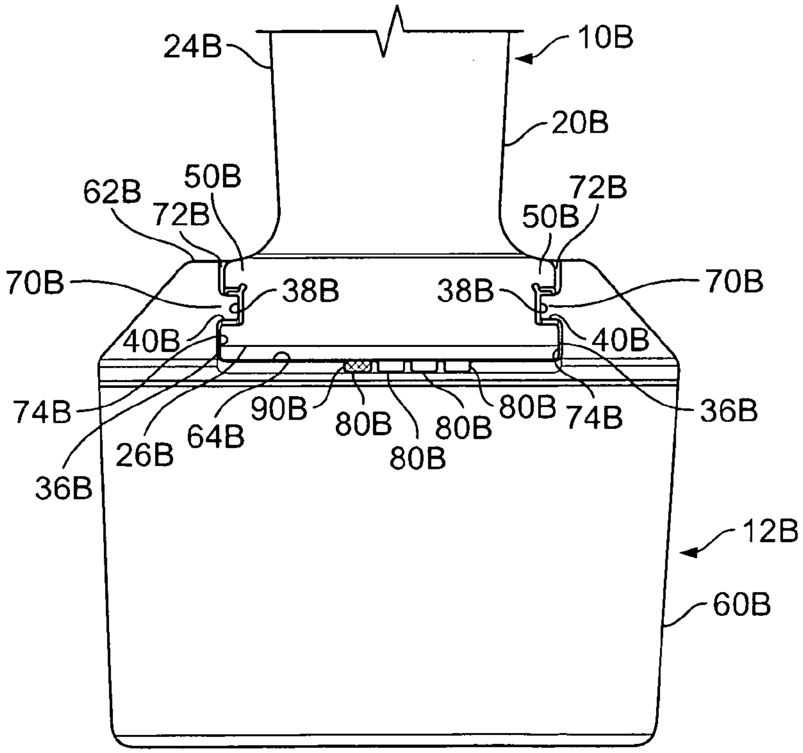

FIG. 5B shows the 12V power tool 10B engaged with and being charged by the receiver 12B, which includes a 12V battery pack, and also shows the positions of the rib 90B associated with the power tool 10B and one of the slots 80B of the receiver 12B receiving the rib 90B. The receiver 12B includes other slots 80B and, thus, is also engageable with and can charge the other power tools 12C-12F. The receiver 12B is not engageable with the power tool 10A because the operating voltage of the power tool 10A is less than the output charging voltage of the receiver 10B.

Figure 5C:
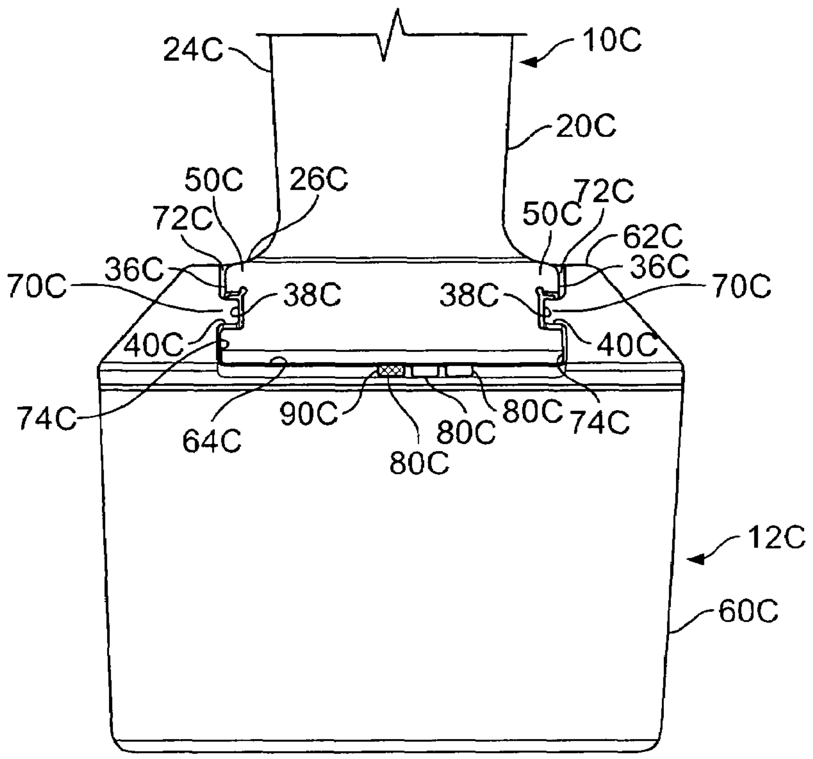

FIG. 5C shows the 14V power tool 10C engaged with and being charged by the receiver 12C, which includes a 14V battery pack, and also shows the positions of the rib 90C associated with the power tool 10C and one of the slots 80C of the receiver 12C receiving the rib 90C. The receiver 12C includes other slots 80C and, thus, is also engageable with and can charge the other power tools 12D-12F. The receiver 12C is not engageable with the power tools 10A-10B.

Figure 5D:
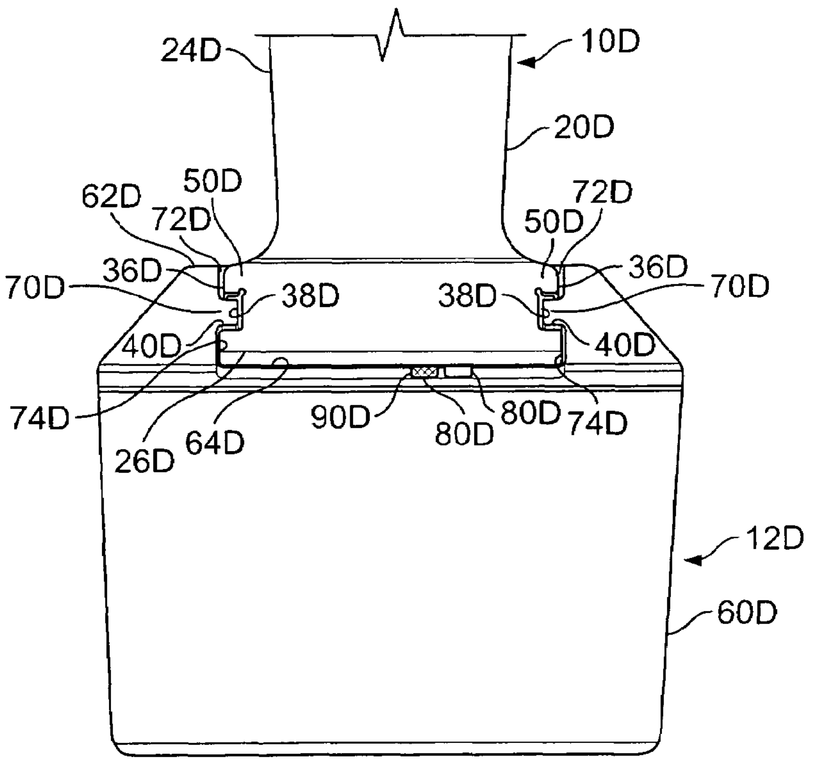

FIG. 5D shows the 18V power tool 10D engaged with and being charged by the receiver 12D, which includes a 18V battery pack, and also shows the positions of the rib 90D associated with the power tool 10D and one of the slots 80D of the receiver 12D receiving the rib 90D. The receiver 12D includes other slots 80D and, thus, is also engageable and can charge the other power tools 12E-12F. The receiver 12D is not engageable with the power tools 10A-10C because those power tools have an operating voltage less than the output charging voltage of the receiver 12D.

Figure 5E:
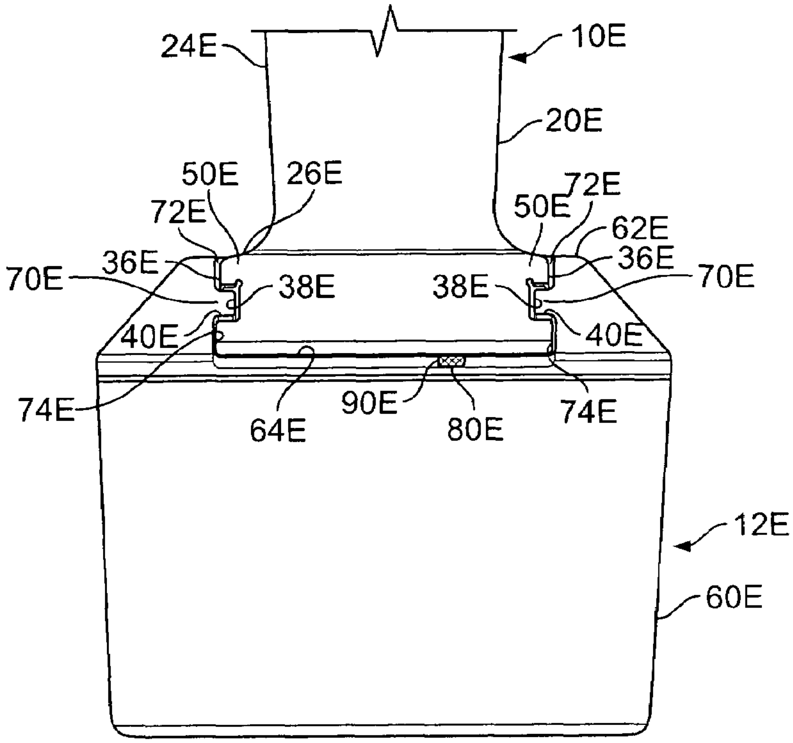

FIG. 5E shows the 20V power tool 10E engaged with and being charged by the receiver 12E, which includes a 20V battery pack, and also shows the positions of the rib 90E associated with the power tool 10E and the slot 80E of the receiver 12E receiving the rib 90E. The receiver 12E is also engageable and can charge the other power tool 12F. The receiver 12E is not engageable with the power tools 10A-10D because those power tools have an operating voltage less than the output charging voltage of the receiver 12E.

Figure 5F:
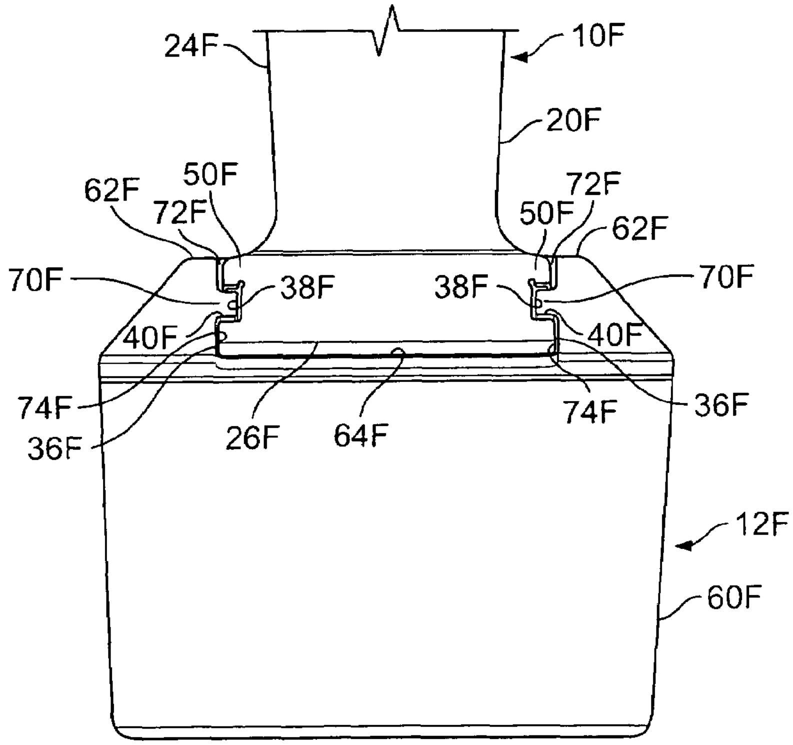

FIG. 5F shows the 24V power tool 10F engaged with and being charged by the receiver 12F, which includes a 14V battery pack. The power tool 10F does not include any ribs 90 and thus is engageable with all of the other receivers 12A-12E because those other receivers have an output charging voltage less than the operating voltage of the tool. The receiver 12F does not include any slots 90.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A kit comprising:

(a) a plurality of power tools having power tool housings of substantially similar constructions, power tools in the kit being configured to operate at an operating voltage different from each other;

(b) a plurality of receivers having receiver housings of substantially similar constructions, the receivers being configured for providing power to the power tools, the plurality of receivers including (i) a first receiver including a power source configured to provide a first output voltage, (ii) a second receiver including a power source configured to provide a second output voltage greater than the first output voltage, (iii) a third receiver including a power source configured to provide a third output voltage greater than the second output voltage, and wherein the first receiver is configured to engage and provide power to power tools having an operating voltage equal to the first output, second output and third output, wherein the second receiver is configured to engage and provide power to power tools having an operating voltage equal to the second output and third output but not to engage and provide power to power tools having an operating voltage equal to the first output, and wherein the third receiver is configured to engage and provide power to power tools having an operating voltage equal to the third output but not to engage and provide power to power tools having an operating voltage equal to the first output and not to engage and provide power to power tools having an operating voltage equal to the second output.

2. The kit of claim 1 wherein the first receiver comprises three slots with one of the three slots corresponding to a rib coupled to a first power tool.

3. The kit of claim 1 wherein the second receiver comprises fewer slots than the first receiver with one of the fewer slots corresponding to a rib coupled to a second power tool.

4. The kit of claim 1 wherein the third receiver comprises even fewer slots than the second receiver with one of the even fewer slots corresponding to a rib coupled to a third power tool.

5. The kit of claim 1 wherein the power tool housings include a base having engaging structure for engaging the receiver housings and each engaging structure is substantially similar in construction to each other.

6. The kit of claim 5 wherein each engaging structure defines a pair of slots and wherein each receiver housing includes engaging structure for engaging the base comprising a pair of rails configured to be slidably receivably by the slots.

7. The kit of claim 1 further including a plurality of terminal blocks, each terminal block associated with a respective one of the power tools, the terminal block configured to electrically connect each receiver with only the one or more power tools.

8. The kit of claim 7 wherein each power tool housing includes a base and each of the terminal blocks is secured to the base of the power tool housing of the respective one of the power tools.

9. The kit of claim 1 wherein the operating voltage of one of the power tools is 9.6 volts, the operating voltage of an other of the power tools is 12 volts, the operating voltage of an other of the power tools is 14.4 volts, the operating voltage of an other of the power tools is 18 volts, the operating voltage of an other of the power tools is 20 volts, and the operating voltage of an other of the power tools is 24 volts, and wherein the output charging voltage of one of the receivers is 9.6 volts, the output charging voltage of an other of the receivers is 12 volts, the output charging voltage of an other of the receivers is 14.4 volts, the output charging voltage of an other of the receivers is 18 volts, the output charging voltage of an other of the receivers is 20 volts, and the output charging voltage of an other of the receivers is 24 volts.

10. The kit of claim 1 wherein each of the power tools includes working elements, the working elements of each power tool being different from the working elements of the other power tools.

11. The kit of claim 1 wherein the power source is a battery.

12. A kit comprising:

(a) a plurality of power tools, a power tool in the kit being configured to operate at an operating voltage different from another power tool in the kit;

(b) a plurality of receivers configured for providing power to the power tools, the plurality of receivers including (i) a first receiver including a power source configured to provide a first output voltage, (ii) a second receiver including a power source configured to provide a second output voltage greater than the first output voltage, and wherein the first receiver is configured to engage and provide power to a power tool having an operating voltage equal to the first output and is configured to engage and provide power to a power tool having an operating voltage equal to the second output, wherein the second receiver is configured to engage and provide power to a power tool having an operating voltage equal to the second output but not to engage and provide power to a power tool having an operating voltage equal to the first output, wherein the receivers are configured to engage and provide power to only power tools having an operating voltage equal to or greater than their respective output voltages.

13. The kit of claim 12 wherein the second receiver is configured to engage and provide power to a power tool having an operating voltage higher than the operating voltage of the second output.

14. The kit of claim 12 wherein the power source is a battery.

15. The kit of claim 12 wherein each of the power tools includes a power tool housing and each power tool housing is substantially similar in construction to each other power tool housing.

16. The kit of claim 12 wherein each receiver includes a receiver housing and each receiver housing is substantially similar in construction to each other receiver housing.

17. The kit of claim 12 wherein each power tool includes a housing having engaging structure for engaging the receivers and each engaging structure is substantially similar in construction to each other engaging structure.

18. The kit of claim 17 wherein each power tool housing includes a base and the engaging structure of each power tool housing defines a slot on the base and wherein each receiver includes engaging structure for engaging the power tools comprising a rail configured to be slidably received by the slot.

19. The kit of claim 12 wherein each power tool includes a power tool housing having a base including engaging structure for engaging the receivers and each engaging structure is substantially similar in construction to each other.

20. The kit of claim 19 wherein the engaging structure of each power tool housing defines a pair of slots on the base and wherein each receiver includes a receiver housing having engaging structure for engaging the power tools comprising a pair of rails configured to be slidably received by the slots.

21. The kit of claim 12 wherein each receiver includes a receiver housing having engaging structure for engaging the power tools and each engaging structure is substantially similar in construction to each other.

22. The kit of claim 21 wherein the engaging structure of each receiver housing is configured to engage the base of each of the power tools.

23. The kit of claim 12 further including a plurality of terminal blocks, each terminal block secured to a respective one of the power tools, the terminal block configured to electrically connect each receiver with only the one or more power tools.

24. The kit of claim 23 wherein each power tool includes a housing having a base and each of the terminal blocks is secured to the base of the respective one of the power tools.

25. The kit of claim 23 wherein each of the power tools includes a power tool housing and each power tool housing is substantially similar in construction to each other.

26. The kit of claim 25 wherein each receiver includes a receiver housing and each receiver housing is substantially similar in construction to each other.

27. The kit of claim 12 wherein each of the power tools include working elements, the working elements being different from each other.

28. The kit of claim 12 wherein there are at least six power tools, the operating voltage of one of the power tools being 9.6 volts, the operating voltage of an other of the power tools being 12 volts, the operating voltage of an other of the power tools being 14.4 volts, the operating voltage of an other of the power tools being 18 volts, the operating voltage of an other of the power tools being 20 volts, and the operating voltage of an other of the power tools being 24 volts.

29. The kit of claim 12 wherein there are at least six receivers, the output charging voltage of one of the receivers being 9.6 volts, the output charging voltage of an other of the receivers being 12 volts, the output charging voltage of an other of the receivers being 14.4 volts, the output charging voltage of an other of the receivers being 18 volts, the output charging voltage of an other of the receivers being 20 volts, and the output charging voltage of an other of the receivers being 24 volts.

* * * * *